US009763211B2

United States Patent
Li et al.

(10) Patent No.: US 9,763,211 B2
(45) Date of Patent: *Sep. 12, 2017

(54) OPEN-LOOP TIMING AND CYCLIC PREFIXES IN CELLULAR INTERNET OF THINGS COMMUNICATION

(71) Applicant: QUALCOMM Incorporated, San Diego, CA (US)

(72) Inventors: Junyi Li, Chester, NJ (US); Frank Anton Lane, Easton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,887

(22) Filed: Oct. 25, 2016

(65) Prior Publication Data

US 2017/0041898 A1 Feb. 9, 2017

Related U.S. Application Data

(63) Continuation of application No. 14/510,910, filed on Oct. 9, 2014, now Pat. No. 9,510,311.

(51) Int. Cl.
*H04J 1/16* (2006.01)
*H04W 56/00* (2009.01)
(Continued)

(52) U.S. Cl.
CPC ......... *H04W 56/0085* (2013.01); *H04J 11/00* (2013.01); *H04L 27/26* (2013.01);
(Continued)

(58) Field of Classification Search
CPC ................. H04L 5/0007; H04L 27/206; H04L 2012/5608; H04L 69/22; H04L 27/26; H04J 11/00; H04J 2011/0009; H04B 7/2045; H04B 7/2621; H04B 7/208; H04W 56/0085; H04W 4/005; H04W 72/042; H04W 76/02; H04W 52/0209; H04W 88/02
(Continued)

(56) References Cited

U.S. PATENT DOCUMENTS 6,922,388 B1 7/2005 Laroia et al.
8,311,000 B2 11/2012 Chmiel et al.
(Continued)

FOREIGN PATENT DOCUMENTS

WO WO-2014112907 A1 7/2014

OTHER PUBLICATIONS

ISA/EPO, International Search Report and Written Opinion of the International Searching Authority, Int'l. App. No. PCT/US2015/051178, Dec. 8, 2015, European Patent Office, Rijswijk, NL, 10 pgs.

*Primary Examiner* — Brenda H Pham
(74) *Attorney, Agent, or Firm* — Holland & Hart

(57) ABSTRACT

Methods, systems, and devices are described for wireless communication at a user equipment (UE). A UE may establish a connection with a cell based on an initial access procedure. The UE may also receive a downlink signal from the cell which includes a first cyclic prefix. The UE may transmit an uplink signal with a second cyclic prefix to the cell. The second cyclic prefix may have a different length than the first cyclic prefix.

19 Claims, 11 Drawing Sheets

(51) Int. Cl.
*H04J 11/00* (2006.01)
*H04L 29/06* (2006.01)
*H04W 4/00* (2009.01)
*H04W 72/04* (2009.01)
*H04W 76/02* (2009.01)
*H04L 27/26* (2006.01)
*H04W 52/02* (2009.01)
*H04W 88/02* (2009.01)

(52) U.S. Cl.
CPC ............ *H04L 69/22* (2013.01); *H04W 4/005* (2013.01); *H04W 52/0209* (2013.01); *H04W 72/042* (2013.01); *H04W 76/02* (2013.01); *H04J 2011/0009* (2013.01); *H04W 88/02* (2013.01)

(58) Field of Classification Search
USPC ................ 370/203, 208, 319, 344, 235, 349
See application file for complete search history.

(56) References Cited

U.S. PATENT DOCUMENTS

| | | |
|---|---|---|
| 8,369,301 B2 | 2/2013 | Cai |
| 8,644,874 B2 | 2/2014 | Englund et al. |
| 8,681,666 B2 | 3/2014 | Montojo et al. |
| 9,510,311 B2 * | 11/2016 | Li ............................ H04J 11/00 |
| 2007/0058595 A1 | 3/2007 | Classon et al. |
| 2008/0165866 A1 | 7/2008 | Teo et al. |
| 2009/0247087 A1 | 10/2009 | Chin et al. |
| 2011/0164698 A1 | 7/2011 | Wu |
| 2012/0281551 A1 * | 11/2012 | Alanara ............. H04L 27/2607 370/252 |
| 2013/0003897 A1 | 1/2013 | Kim et al. |

* cited by examiner

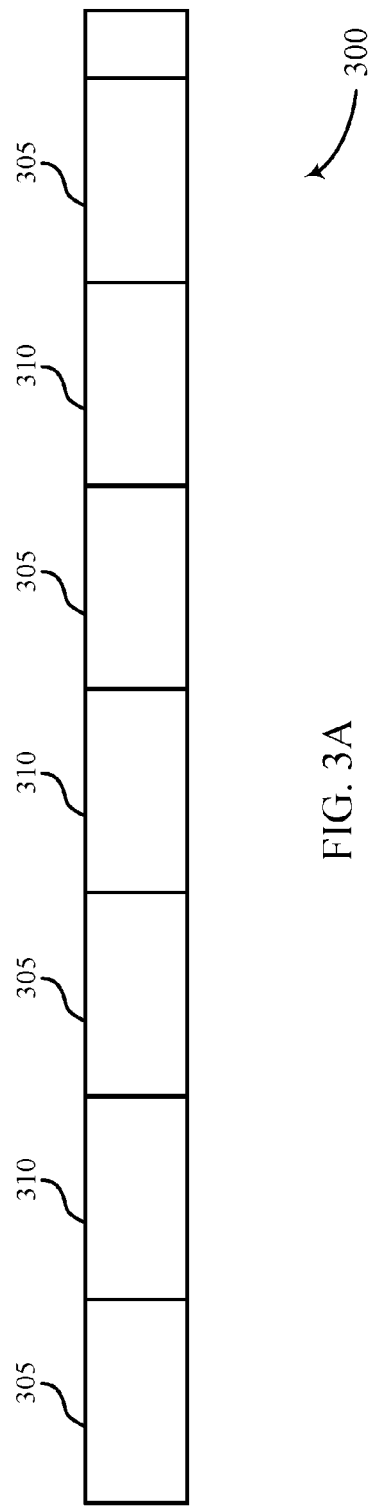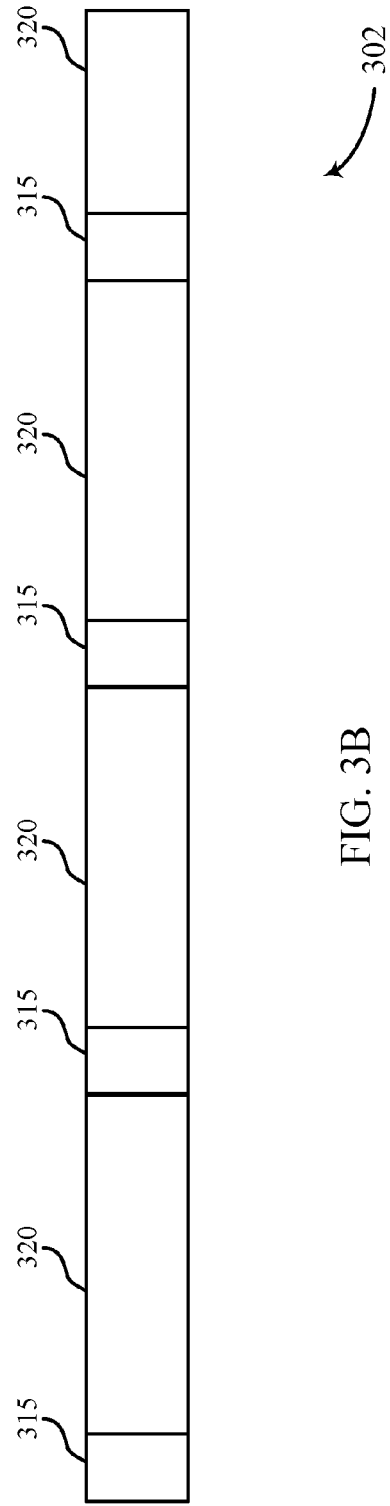
FIG. 3A
FIG. 3B

OPEN-LOOP TIMING AND CYCLIC PREFIXES IN CELLULAR INTERNET OF THINGS COMMUNICATION

CROSS REFERENCES

The present Application for patent is a continuation of U.S. patent application Ser. No. 14/510,910 by Li et al., entitled "Open-Loop Timing And Cyclic Prefixes In Cellular Internet Of Things Communication," filed Oct. 9, 2014, assigned to the assignee hereof.

BACKGROUND

Field of Disclosure

The following relates generally to wireless communication, and more specifically to open-loop timing and cyclic prefixes in cellular internet of things (IoT) communication.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

Some UEs may provide for automated communication. Automated UEs may include those implementing Machine-to-Machine (M2M) communication or Machine Type Communication (MTC). M2M or MTC may refer to data communication technologies that allow devices to communicate with one another or a base station without human intervention. M2M or MTC devices may include UEs and may be used as part of an Internet of Things (IoT). Some M2M or MTC devices in an IoT may include parking meters, water and gas meters, and other sensors that may infrequently communicate small amounts of data.

In some cases, including in an IoT, a UE may be a power limited device, and closed loop synchronization may be a significant drain on the available power resources of the device (i.e., the battery). In cases where a UE transmits small data infrequently, the cost of maintaining closed loop timing may not be justified. For example, in a closed loop timing scheme, a UE may transmit an uplink signal to a base station in order to receive a timing advance to synchronize a data transmission. In such a scenario, the overhead cost of the closed loop timing uplink transmission may result in significant power consumption.

SUMMARY

The present disclosure may relate generally to wireless communications systems, and more particularly to improved systems, methods, and/or apparatuses for using open-loop timing and cyclic prefixes in cellular IoT communication. The UE may establish a connection with a cell based on an initial access procedure. The UE may receive a downlink signal from the cell, the downlink signal including an OFDMA signal or single carrier frequency division multiple access (SC-FDMA) signal, the downlink signal further including a first cyclic prefix. The UE may transmit an uplink signal to the cell, wherein the uplink signal may be one of an OFDMA signal or SC-FDMA signal with a second cyclic prefix, and wherein the second cyclic prefix has a different length than the first cyclic prefix. The UE may estimate a time of arrival of the received downlink signal. The UE may determine a transmit symbol time for the uplink signal to the cell based on the estimated time of arrival of the received downlink signal. The UE may receive an allocation of resources for the transmitting of the uplink signal to the cell. In some examples the transmitting of the uplink signal includes transmitting a first transmission of data on an uplink symbol that includes an extended cyclic prefix that includes at least half of the resources allocated for the transmitting of the uplink signal.

A method of wireless communication at a UE is described. The method may include establishing a connection with a cell based on an initial access procedure, receiving a downlink signal from the cell, the downlink signal comprising an OFDMA signal or SC-FDMA signal, the downlink signal further comprising a first cyclic prefix, and transmitting an uplink signal to the cell, wherein the uplink signal is one of an OFDMA signal or SC-FDMA signal with a second cyclic prefix, and wherein the second cyclic prefix has a different length than the first cyclic prefix.

An apparatus for wireless communication at a UE is described. The apparatus may include means for establishing a connection with a cell based on an initial access procedure, means for receiving a downlink signal from the cell, the downlink signal comprising an OFDMA signal or SC-FDMA signal, the downlink signal further comprising a first cyclic prefix, and means for transmitting an uplink signal to the cell, wherein the uplink signal is one of an OFDMA signal or SC-FDMA signal with a second cyclic prefix, and wherein the second cyclic prefix has a different length than the first cyclic prefix.

A further apparatus for wireless communication at a UE is described. The apparatus may include a processor, memory in electronic communication with the processor, and instructions stored in the memory, wherein the instructions are executable by the processor to establish a connection with a cell based on an initial access procedure, receive a downlink signal from the cell, the downlink signal comprising an OFDMA signal or SC-FDMA signal, the downlink signal further comprising a first cyclic prefix, and transmit an uplink signal to the cell, wherein the uplink signal is one of an OFDMA signal or SC-FDMA signal with a second cyclic prefix, and wherein the second cyclic prefix has a different length than the first cyclic prefix.

A non-transitory computer-readable medium storing code for wireless communication at a UE is described. The code may include instructions executable to establish a connection with a cell based on an initial access procedure, receive a downlink signal from the cell, the downlink signal comprising an OFDMA signal or SC-FDMA signal, the downlink signal further comprising a first cyclic prefix, and transmit an uplink signal to the cell, wherein the uplink signal is one of an OFDMA signal or SC-FDMA signal with a second cyclic prefix, and wherein the second cyclic prefix has a different length than the first cyclic prefix.

In some examples of the method, apparatuses, and/or non-transitory computer-readable medium described above, a subcarrier spacing of the downlink signal is different from a subcarrier spacing of the uplink signal. Additionally or alternatively, in some examples the uplink signal includes payload data traffic.

Some examples of the method, apparatuses, and/or non-transitory computer-readable medium described above may further include estimating a time of arrival of the received downlink signal, and determining a transmit symbol time for the uplink signal to the cell based on the estimated time of arrival of the received downlink signal. Additionally or alternatively, in some examples a length of the second cyclic prefix is longer than a length of the first cyclic prefix.

In some examples of the method, apparatuses, and/or non-transitory computer-readable medium described above, the length of the second cyclic prefix is at least twice as long as the length of the first cyclic prefix. Additionally or alternatively, in some examples a subcarrier spacing of the downlink signal is larger than a subcarrier spacing of the uplink signal.

In some examples of the method, apparatuses, and/or non-transitory computer-readable medium described above, the subcarrier spacing of the downlink signal is at least twice as large as the subcarrier spacing of the uplink signal. Additionally or alternatively, some examples may include receiving an allocation of resources for the transmitting of the uplink signal to the cell, and the transmitting of the uplink signal comprises transmitting a first transmission of data on an uplink symbol that includes an extended cyclic prefix that comprises at least half of the resources allocated for the transmitting of the uplink signal.

Some examples of the method, apparatuses, and/or non-transitory computer-readable medium described above may further include synchronizing the uplink signal to account for a round trip delay for communications between the UE and the cell. Additionally or alternatively, some examples may include exchanging data with a network based on machine type communication (MTC) procedures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 3A and 3B illustrate examples of uplink and downlink transmissions, respectively, using different lengths of cyclic prefixes in accordance with various aspects of the present disclosure;

DETAILED DESCRIPTION

Figure 1:
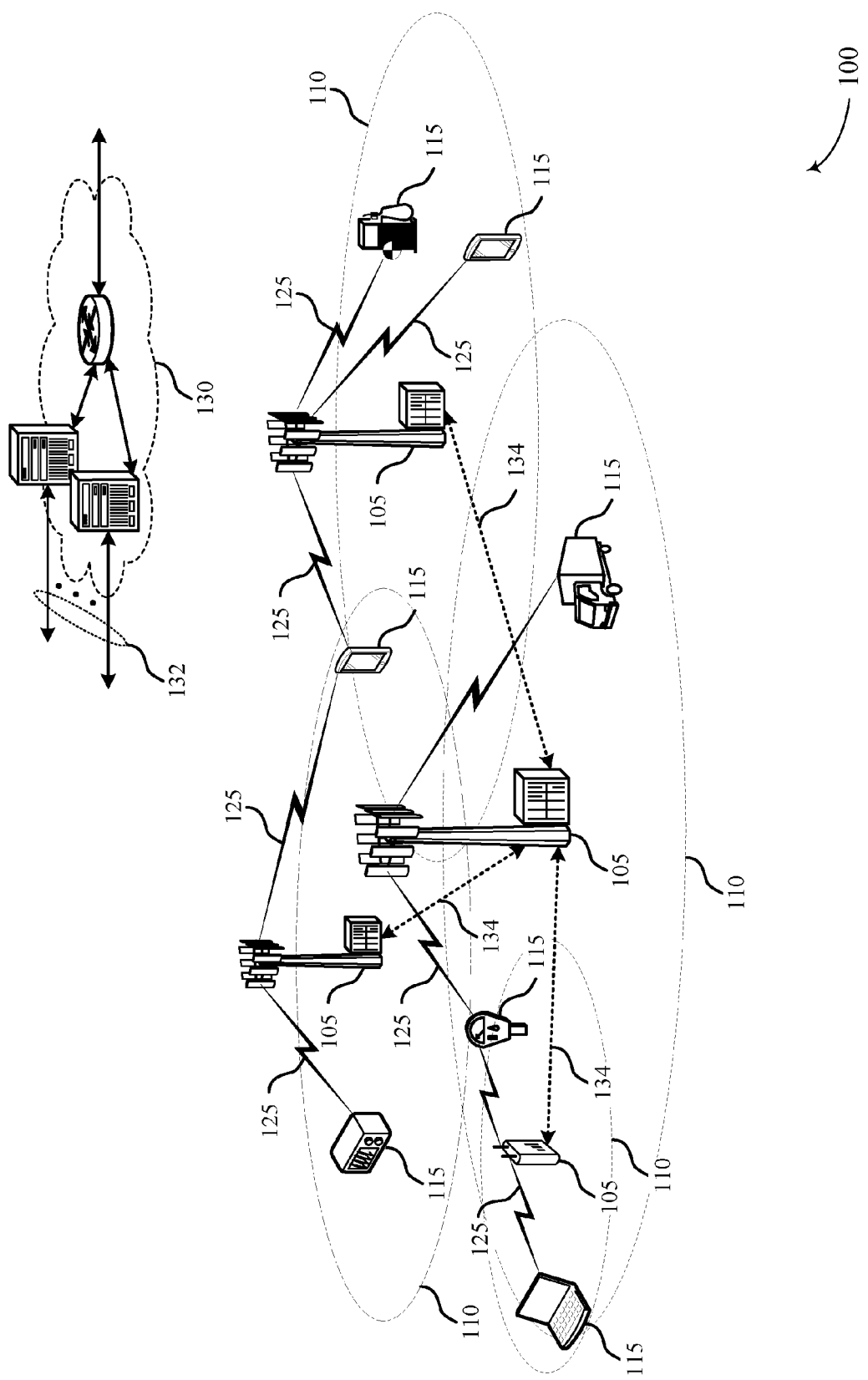
FIG. 1 illustrates an example of a wireless communications system using open-loop timing and cyclic prefixes in cellular internet of things (IoT) communication in accordance with various aspects of the present disclosure.

A network of automated devices which communicate wirelessly may, in some cases, be referred to as the internet of things (IoT). Devices which communicate over the IoT network (e.g., machine type communication (MTC) devices) may include automated meters, sensors, and the like. In some instances, the automated devices may have relatively low throughput applications (e.g., a water level sensor sending an update to a base station). There may be a number of wireless communication systems available for use by the automated devices, including cellular systems operating in licensed spectrum. However, cellular systems may be optimized for devices which use high through-put applications. Devices that operate according to low throughput conditions (e.g., infrequent and small data transfers) may present design considerations different from those associated with higher through-put devices. For example, an automated device may be designed to operate for long periods of time without battery replacement.

In some cases, a cellular system may optimize power usage in individual TOT devices by reducing timing synchronization overhead. For example, an TOT device (such as a UE) may forego closed-loop timing in favor of open-loop timing. As such, the TOT device may be able to conserve power by not participating in unnecessary timing and synchronization communications. However, the use of open-loop timing may result in communications from different TOT devices within a base station's geographic coverage area to become unsynchronized unless a longer uplink cyclic prefix is used. Thus, in an open-loop timing scheme, an uplink transmission from an TOT device to a base station may comprise a cyclic prefix length that is different from a downlink cyclic prefix length such that a round trip delay is covered. In some instances, the cyclic prefix length of the uplink may be longer than the cyclic prefix length of the downlink. In this or other examples, the subcarrier spacing of the uplink may be different from the subcarrier spacing of the downlink (e.g., the subcarrier spacing of the downlink may be larger than the subcarrier spacing of the uplink).

In some examples, a device may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

In some examples, a device may synchronize with a cell using a waveform known to the UE beforehand, and common to a group of cells in the local region. The device may then determine a physical broadcast channel (PBCH) time. The device may receive the PBCH and use it to determine a physical layer ID for the cell and a frequency for uplink transmissions. The PBCH may also indicate a channel configuration, which may enable the device to perform a random access procedure. The channel configuration may include a time and frequency resource configuration of a shared traffic channel. In some cases, the device may determine resources for data transmission based on an index of a control channel transmission. In some cases, there may be a predetermined delay between control channel transmissions and data channel transmissions. The device may then enter a low power state during the delay.

In another example, a base station may allocate, to a device, time and/or frequency resources for transmitting physical random access channel (PRACH) signals. In such instance, the resource allocation may be apportioned based on a type and class of PRACH signal. For example, a UE may be assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at the device).

In some examples, a device may perform an initial access procedure to establish a connection with a serving cell. The device may then arrange a regular transmission schedule with the serving cell including a discontinuous transmission (DTX) cycle and an acknowledgement schedule. The device may enter a low power mode and refrain from any transmission during the a sleep interval of the DTX cycle. The device may then wake up and transmit a message to the serving cell after the sleep interval without performing an another access procedure. The device may perform another access procedure to transmit at times not covered by the regular transmission schedule. For example, if an acknowledgement (ACK) for the message isn't received, the device may perform another access procedure for retransmission.

In yet another example, an IoT device may use stored control information from a first communication session with the base station to determine the power and timing control information for a subsequent second communication session. Specifically, in this example, a device may establish a first communication session with the base station and receive, during the first communication session, closed loop control information from the base station to aid the device in adjusting transmit signal symbol timing and/or power control levels associated with an uplink transmission. In such instance, the device may store, in its memory, the transmit power and symbol timing information derived from the closed loop control information during the first communication session. Subsequently, the device may utilize the stored closed loop control information from the first communication session to determine the transmit signal power and/or symbol timing to establish a second communication session with the base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 using open-loop timing and cyclic prefixes in cellular internet of things (IoT) communication in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

In the wireless communications system 100, some UEs may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. The UEs 115 in wireless communications system 100 that are M2M or MTC devices may also be part of an IoT. Thus, wireless communications system 100 may also include or be part of an IoT system.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In certain examples, wireless communications system 100 may utilize orthogonal frequency division multiple access (OFDMA) on downlink transmissions and single carrier frequency division multiple access (SC-FDMA) on uplink transmissions. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

In some cases, a UE 115 may employ open-loop timing synchronization, which may conserve power. For example, a UE 115 may establish a connection with a base station 105 based on an initial access procedure. Then, instead of establishing a closed-loop timing synchronization during the initial access procedure, the UE 115 may be enabled to continue communications with the base station 105 using open-loop timing synchronization. For example, after the initial access procedure, the UE 115 may receive a downlink signal from the base station 105. The downlink signal may include an OFDMA signal or an SC-FDMA signal, and may further include a first cyclic prefix. Additionally, the UE 115 may transmit an uplink signal to the base station 105, wherein the uplink signal may be one of an OFDMA signal or SC-FDMA signal having a second cyclic prefix. Because the window of time during which the uplink signal may arrive at the base station may vary significantly due to the use of open-loop timing synchronization, the second cyclic prefix may have a different length than the first cyclic prefix. In particular, the second cyclic prefix may be longer than the first cyclic prefix, as described in greater detail below.

Figure 2:
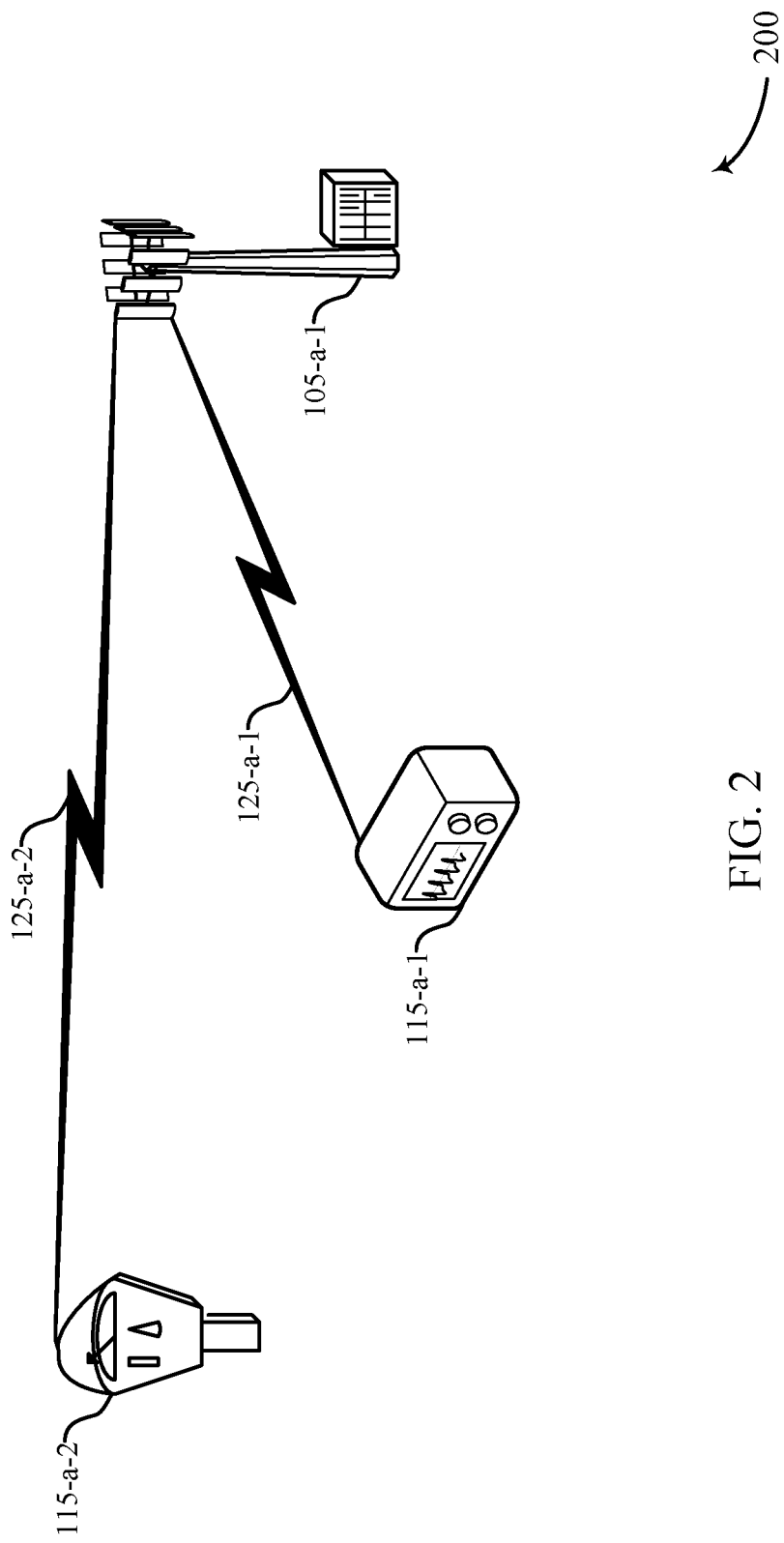
FIG. 2 illustrates an example of a wireless communications subsystem using open-loop timing and cyclic prefixes in cellular IoT communication in accordance with various aspects of the present disclosure.

FIG. 2 illustrates an example of a wireless communications subsystem 200 using open-loop timing and cyclic prefixes in cellular IoT communication in accordance with various aspects of the present disclosure. Wireless communications subsystem 200 may include UE 115-a-1 and UE 115-a-2, which may be examples of UEs 115 described above with reference to FIG. 1. Wireless communications subsystem 200 may also include a base station 105-a-1, which may be an example of a base station 105 described above with reference to FIG. 1. UE 115-a-1 and UE 115-a-2 may communicate with base station 105-a-1 via communication link 125-a-1 and communication link 125-a-2, respectively. Communication link 125-a-1 and communication link 125-a-2 may comprise uplink and downlink communications, as described above with reference to FIG. 1.

In a closed-loop timing scheme, a base station 105 may synchronize uplink transmissions from a UE 115 so that the uplink arrives within a certain window of time. For example, a base station 105 may send a timing advance to a UE 115 in order to cover the round trip delay (e.g., the time it takes a signal to propagate between a base station 105 and a UE 115). The timing advance may be determined based on a signal sent from a UE 115. This additional signal and the establishment of a timing advance may represent unnecessary and even costly overhead for an IoT device that is prone to infrequent and small amounts of data transmission.

Additionally, in some instances, different UEs 115 may experience different round trip delays. For example, the distance between UE 115-a-2 and base station 105-a-1 may be farther than the distance between UE 115-a-1 and base station 105-a-1. In such a scenario, communication link 125-a-2 may have a longer transmit path compared to communication link 125-a-1. Accordingly, communication link 125-a-2 may experience a longer round trip delay than communication link 125-a-1. Thus, an uplink from UE 115-a-1 may be received at base station 105-a-1 at a different time than an uplink from UE 115-a-2, which may result in reduced signal reception. Therefore, communication subsystem 200 may implement open-loop timing which may improve signal reception and conserve power resources.

For example, UE 115-a-1 may establish a connection with base station 105-a-1 based on an initial access procedure. The initial access procedure may include the UE 115-a-1 decoding a system information block (SIB) and, based on the SIB, transmitting a random access channel (RACH) preamble to the base station 105-a-1. For example, the RACH preamble may be randomly selected from a set of 64 predetermined sequences. This may enable the base station 105-a-1 to distinguish between multiple UEs 115 trying to access the system simultaneously. The base station 105-a-1 may respond with a random access response that provides an UL resource grant and a temporary cell radio network temporary identity (C-RNTI). In a closed-loop system, the random access response may also include a timing advance. The timing advance, however, is not used in an open-loop timing system.

After the initial random access procedure, the UE 115-a-1 may receive a downlink signal from base station 105-a-1. In some examples, the downlink signal may include an OFDMA signal or an SC-FDMA signal. Additionally, the downlink signal may further including a first cyclic prefix. UE 115-a-1 may estimate a time of arrival of the received downlink signal. UE 115-a-1 may determine a transmit symbol time for the uplink signal to base station 105-a-1 based on the estimated time of arrival of the received downlink signal. Using the transmit symbol time, the UE 115-a-1 may adjust a second cyclic prefix used during the transmission of an uplink signal to base station 105-a-1. The uplink signal may be one of an OFDMA signal or SC-FDMA signal, and the second cyclic prefix may have a different length than the first cyclic prefix.

FIG. 3A illustrates an example of an uplink signal transmission 300 that may be used in an open-loop timing system, in accordance with various aspects of the present disclosure. Uplink signal transmission 300 may be an example of a transmission that may be made over a communication link 125 by a UE 115 to a base station 105, as described above with reference to FIG. 1 or 2. In some embodiments, uplink signal transmission 300 may include data payload traffic.

For instance, uplink signal transmission 300 may comprise a number of symbols which include two parts: a cyclic prefix 305 and a payload 310. Cyclic prefix 305 may be used to mitigate the effects of multipath. For example, in a multipath scenario, an uplink from a UE 115 may be received at a base station 105 from several different transmit paths. In such an instance, the uplink may experience delay spread and be received by the base station 105 not entirely within the designated receive time. To compensate for this delay, a portion of each symbol may be appended to the beginning of its respective symbol (e.g., a cyclic prefix) so that the entirety of the signal may be recovered, irrespective of the delay spread. In open-loop timing, uplink signal transmission 300 may be configured such that cyclic prefix 305 is long enough to cover round trip delay as well as delay spread.

FIG. 3B illustrates an example of a downlink signal transmission 302 that may be used in an open-loop timing system, in accordance with various aspects of the present disclosure. Downlink signal transmission 302 may be an example of a transmission that may be made over a communication link 125 by a base station 105 to a UE 115, as described above with reference to FIG. 1 or 2.

Downlink signal transmission 302 may comprise a number of symbols which include two parts: a cyclic prefix 315 and a payload 320. In open-loop timing, a UE 115 may receive a downlink transmission at any time. Thus, the length of cyclic prefix 315 may not need to cover round trip delay, and may be relatively short. In other words, open-loop timing may allow a UE 115 to receive a downlink transmission at any time, and a base station 105 may receive an uplink transmission according to a certain receive time. Thus, the length of uplink cyclic prefix 305 (of FIG. 3A) may be different from the length of downlink cyclic prefix 315. In some instances, the length of uplink cyclic prefix 305 may be longer than the length of downlink cyclic prefix 315. For example, the length of uplink cyclic prefix 305 may be at least twice as long as the length of downlink cyclic prefix 315.

In some instances, the subcarrier spacing of an uplink signal may be different from the subcarrier spacing of a downlink signal. Transmit symbol time is a function of the subcarrier spacing, thus, changing the subcarrier spacing of the uplink may change the transmit symbol time of an uplink symbol. For example, due to the inverse relationship between subcarrier spacing and transmit symbol time, a larger subcarrier spacing may result in a smaller transmit symbol time. Thus, in downlink signal transmission 302, which utilizes a shorter downlink cyclic prefix 315 (meaning that the transmit symbol time may also be smaller), a larger subcarrier spacing may be used. Conversely, in uplink signal transmission 300, which utilizes a longer uplink cyclic prefix 305 (meaning that the transmit symbol time may also be longer), a smaller subcarrier spacing may be used. Thus, in some embodiments the subcarrier spacing of a downlink signal may be larger than the subcarrier spacing of an uplink signal. In this or other examples, the subcarrier spacing of a downlink signal may be at least twice as large as the subcarrier spacing of the uplink signal.

Figure 4:
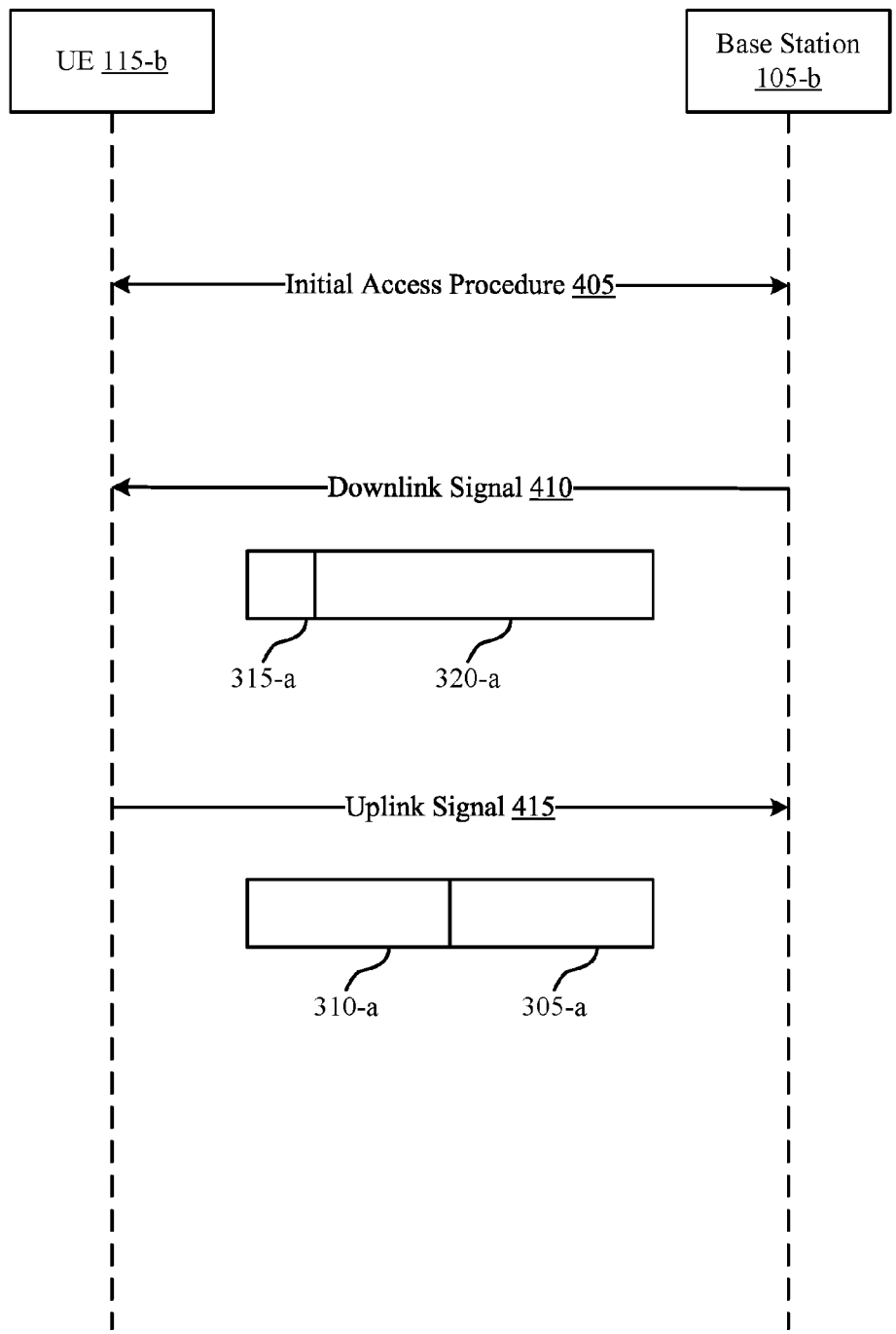
FIG. 4 illustrates an example of a process flow diagram for using open-loop timing and cyclic prefixes in cellular IoT communication in accordance with various aspects of the present disclosure.

FIG. 4 illustrates an example of a process flow diagram 400 for using open-loop timing and cyclic prefixes in cellular IoT communication in accordance with various aspects of the present disclosure. Process flow diagram 400 may include a UE 115-b, which may be an example of a UE 115 described above with reference to FIG. 1 or 2. Process flow diagram 400 may also include a base station 105-b, which may be an example of a base station 105 described above with reference to FIG. 1 or 2.

UE 115-b may establish a connection with base station 105-b based on an initial access procedure 405. As explained above, the initial access procedure 405 may include the transmission of a RACH signal from the UE 115-b to the base station 105-b. After the initial access procedure 405 is complete, the UE 115-b may receive a downlink signal 410 from base station 105-b. The downlink signal 410 may include an OFDMA signal or SC-FDMA signal, and may also include a first cyclic prefix 315-a. Downlink signal 410 and downlink cyclic prefix 315-a may be aspects of downlink signal transmission 302 and downlink cyclic prefix 315, respectively, as described with reference to FIG. 3B. As described above with respect to FIGS. 3A and 3B, the downlink cyclic prefix 315-a may be relatively short compared to the payload 320-a.

UE 115-b may also transmit an uplink signal 415 to base station 105-b, wherein the uplink signal 415 may be one of an OFDMA signal or SC-FDMA signal with a second cyclic prefix 305-a, and wherein the second cyclic prefix 305-a has a different length than the first cyclic prefix 315-a. Uplink signal 415 and cyclic prefix 305-a may be aspects of uplink signal transmission 300 and uplink cyclic prefix 305, as described with reference to FIG. 3A. In some examples a subcarrier spacing of downlink signal 410 is different from a subcarrier spacing of uplink signal 415. In some examples the uplink signal includes payload data traffic such as payload 310-a.

In some examples UE 115-b may estimate a time of arrival of the received downlink signal 410. The UE 115-b may determine a transmit symbol time for uplink signal 415 to base station 105-b based on the estimated time of arrival of the received downlink signal 410. In some examples a length of the second cyclic prefix 305-a is longer than a length of the first cyclic prefix 315-a (e.g., the length of the second cyclic prefix 305-a may be at least twice as long as the length of the first cyclic prefix 315-a). In this or other examples, a subcarrier spacing of downlink signal 410 may be larger than a subcarrier spacing of uplink signal 415. In some embodiments the subcarrier spacing of downlink signal 410 is at least twice as large as the subcarrier spacing of uplink signal 415.

In some instances, UE 115-b may receive an allocation of resources for the transmitting of uplink signal 415 to base station 105-b. In these instances, the transmitting of uplink signal 415 may include transmitting a first transmission of data on an uplink symbol that includes an extended cyclic prefix 305-a, where the cyclic prefix 305-a may include at least half of the resources allocated for the transmitting of uplink signal 415. UE 115 may synchronize uplink signal 415 to account for a round trip delay for communications between UE 115-b and base station 105-b. In some embodiments, UE 115-b may exchange data with a network based on machine type communication (MTC) procedures.

Figure 5:
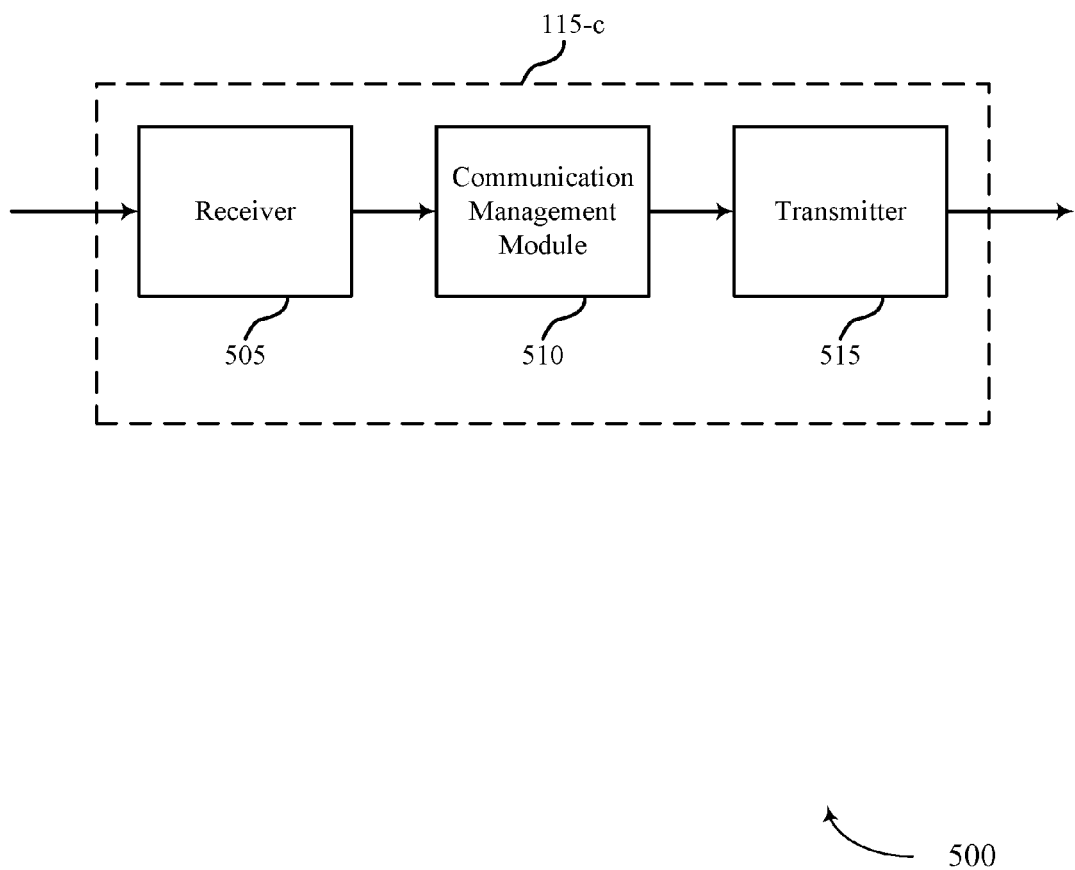
FIG. 5 shows a block diagram of a user equipment (UE) configured to use open-loop timing and cyclic prefixes in cellular IoT communication in accordance with various aspects of the present disclosure.

FIG. 5 shows a block diagram 500 of a UE 115-c configured to use open-loop timing and cyclic prefixes in cellular IoT communication in accordance with various aspects of the present disclosure. UE 115-c may be an example of aspects of a UE 115 described with reference to FIGS. 1-4. UE 115-c may include a receiver 505, a communication management module 510, and/or a transmitter 515. UE 115-c may also include a processor. Each of these components may be in communication with each other.

The receiver 505 may receive information such as packets, user data, and/or control information associated with various information channels (e.g., control channels, data channels, and information related to open-loop timing and cyclic prefixes in cellular IoT communication, etc.). Information may be passed on to the communication management module 510, and to other components of UE 115-c.

The communication management module 510 may facilitate the establishment of a connection with a cell based on an initial access procedure. Additionally, the communication management module 510 may, in combination with the receiver 505, facilitate the receipt of a downlink signal from the cell, where the downlink signal includes an OFDMA signal or SC-FDMA signal. The downlink signal may further include a first cyclic prefix. Further, the communication management module 510 may, in combination with the transmitter 515, facilitate the transmittal of an uplink signal to the cell. The uplink signal may be one of an OFDMA signal or SC-FDMA signal and may include a second cyclic prefix. The second cyclic prefix may have a different length than the first cyclic prefix.

The transmitter 515 may transmit signals received from other components of UE 115-c. In some embodiments, the transmitter 515 may be collocated with the receiver 505 in a transceiver module. The transmitter 515 may include a single antenna, or it may include a plurality of antennas.

Figure 6:
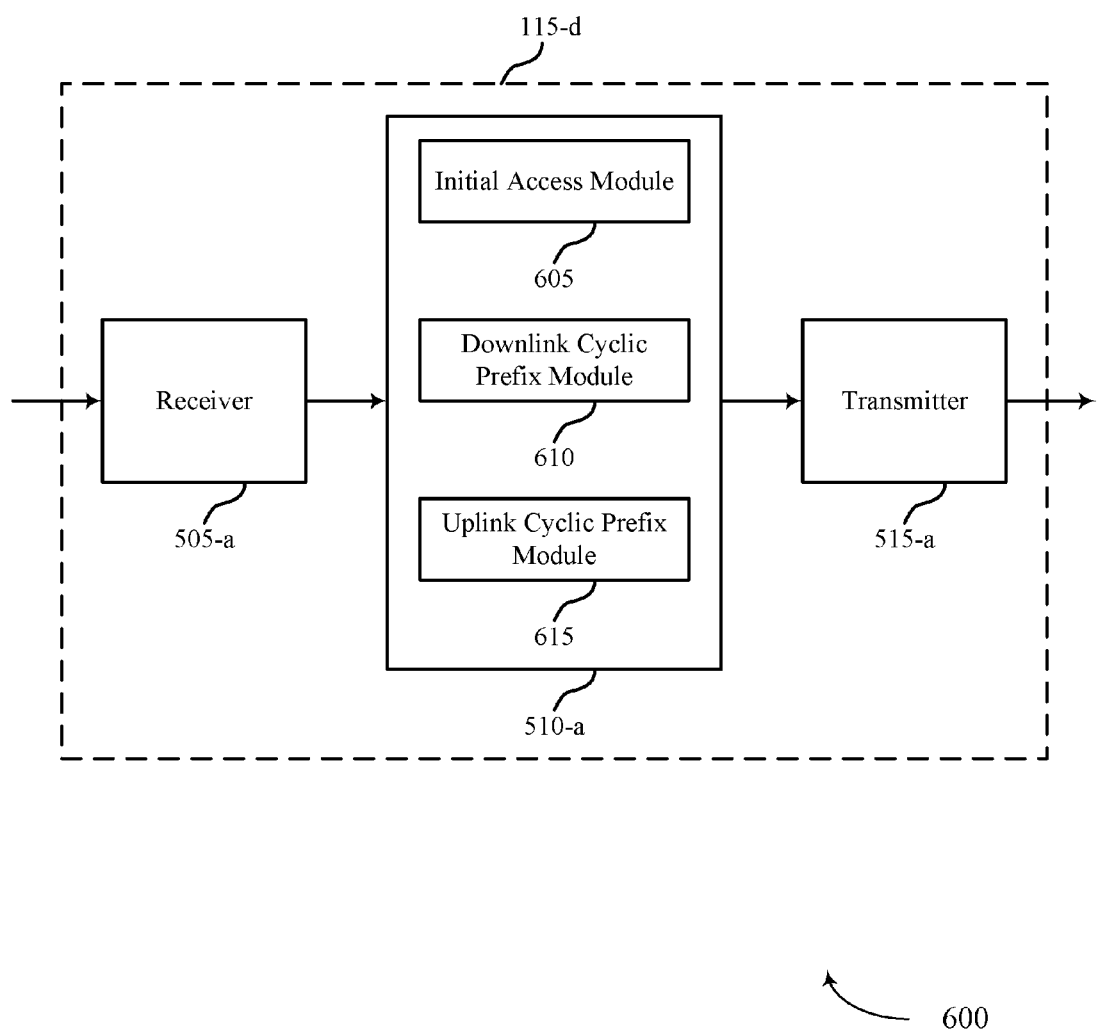
FIG. 6 shows a block diagram of a UE configured to use open-loop timing and cyclic prefixes in cellular IoT communication in accordance with various aspects of the present disclosure.

FIG. 6 shows a block diagram 600 of a UE 115-d configured to use open-loop timing and cyclic prefixes in cellular IoT communication in accordance with various aspects of the present disclosure. UE 115-d may be an example of aspects of a UE 115 described with reference to FIGS. 1-5. UE 115-d may include a receiver 505-a, a communication management module 510-a, or a transmitter 515-a. UE 115-d may also include a processor. Each of these components may be in communication with each other. The communication management module 510-a may also include an initial access module 605, a downlink cyclic prefix module 610, and an uplink cyclic prefix module 615.

The receiver 505-a may receive information which may be passed on to communication management module 510-a and to other components of UE 115-d. The receiver 505-a may be an example of the receiver 505 of FIG. 5. The communication management module 510-a may perform the operations described above with reference to FIG. 5 and as further described below. The transmitter 515-a may transmit signals received from other components of UE 115-d, including the communication management module 510-a. The transmitter 515-a may be an example of the transmitter 515 of FIG. 5.

The initial access module 605 of the communication management module 510-a may facilitate the establishment of a connection with a cell based on an initial access procedure as described above with reference to FIGS. 2-4. For example, the initial access module 605 may generate and coordinate the transmission of a RACH to a cell. In response to the RACH, the initial access module 605 may receive from the cell an allocation of resources for the transmitting of an uplink signal to the cell. As the UE 115-d may use open-loop timing in its communications with the cell, the cell may not transmit a timing advance to the UE 115-d. Thus, in its initial access with the cell, the initial access module 605 may also coordinate the use of open-loop timing with the cell.

The downlink cyclic prefix module 610 may receive or coordinate the receipt of a downlink signal from the cell. The downlink signal may include an OFDMA signal or an SC-FDMA signal. The downlink signal may further include a first cyclic prefix as described above with reference to FIGS. 2-4.

The uplink cyclic prefix module 615 may transmit or coordinate the transmittal of an uplink signal to the cell. The uplink signal may be one of an OFDMA signal or an SC-FDMA signal, and may have a second cyclic prefix. The second cyclic prefix may have a different length than the first cyclic prefix as, described above with reference to FIGS. 2-4. In some examples, a length of the second cyclic prefix may be longer than a length of the first cyclic prefix. In some examples, the length of the second cyclic prefix may be at least twice as long as the length of the first cyclic prefix. Further, in some examples, the uplink signal coordinated by the uplink cyclic prefix module 615 may include payload data traffic. In some examples, the uplink cyclic prefix module 615 may coordinate a first transmission of data on an uplink symbol that includes an extended cyclic prefix that comprises at least half of the resources allocated for the transmitting of the uplink signal.

Figure 7:
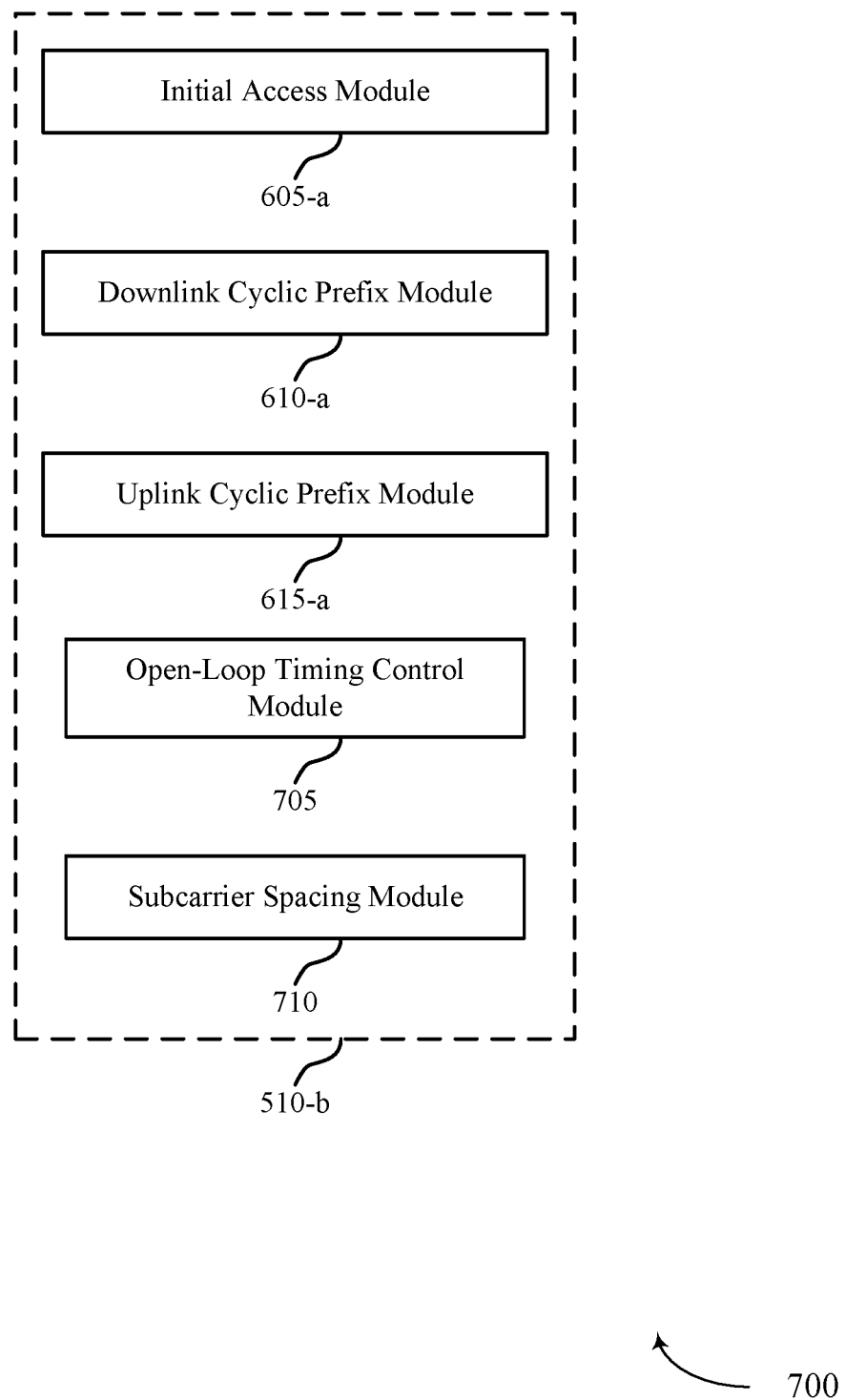
FIG. 7 shows a block diagram of a communication management module configured for use of open-loop timing and cyclic prefixes in cellular IoT communication in accordance with various aspects of the present disclosure.

FIG. 7 shows a block diagram 700 of a communication management module 510-b configured for use of open-loop timing and cyclic prefixes in cellular IoT communication in accordance with various aspects of the present disclosure. The communication management module 510-b may be an example of aspects of a communication management module 510 described with reference to FIG. 5 or 6. The communication management module 510-b may include an initial access module 605-a, a downlink cyclic prefix module 610-a, and an uplink cyclic prefix module 615-a. Each of these modules may perform the functions described above with reference to FIG. 6. The communication management module 510-b may also include an open-loop timing control module 705, and a subcarrier spacing module 710.

The open-loop timing control module 705 may estimate a time of arrival of the received downlink signal as described above with reference to FIGS. 2-4. The open-loop timing control module 705 may also determine a transmit symbol time for the uplink signal to the cell based on the estimated time of arrival of the received downlink signal. The open-loop timing control module 705 may also synchronize the uplink signal to account for a round trip delay for communications between the UE 115 and the cell.

The subcarrier spacing module 710 may be configured such that a subcarrier spacing of the downlink signal may be larger than a subcarrier spacing of the uplink signal as described above with reference to FIGS. 2-4. In some examples, the subcarrier spacing of the downlink signal may be at least twice as large as the subcarrier spacing of the uplink signal.

Figure 8:
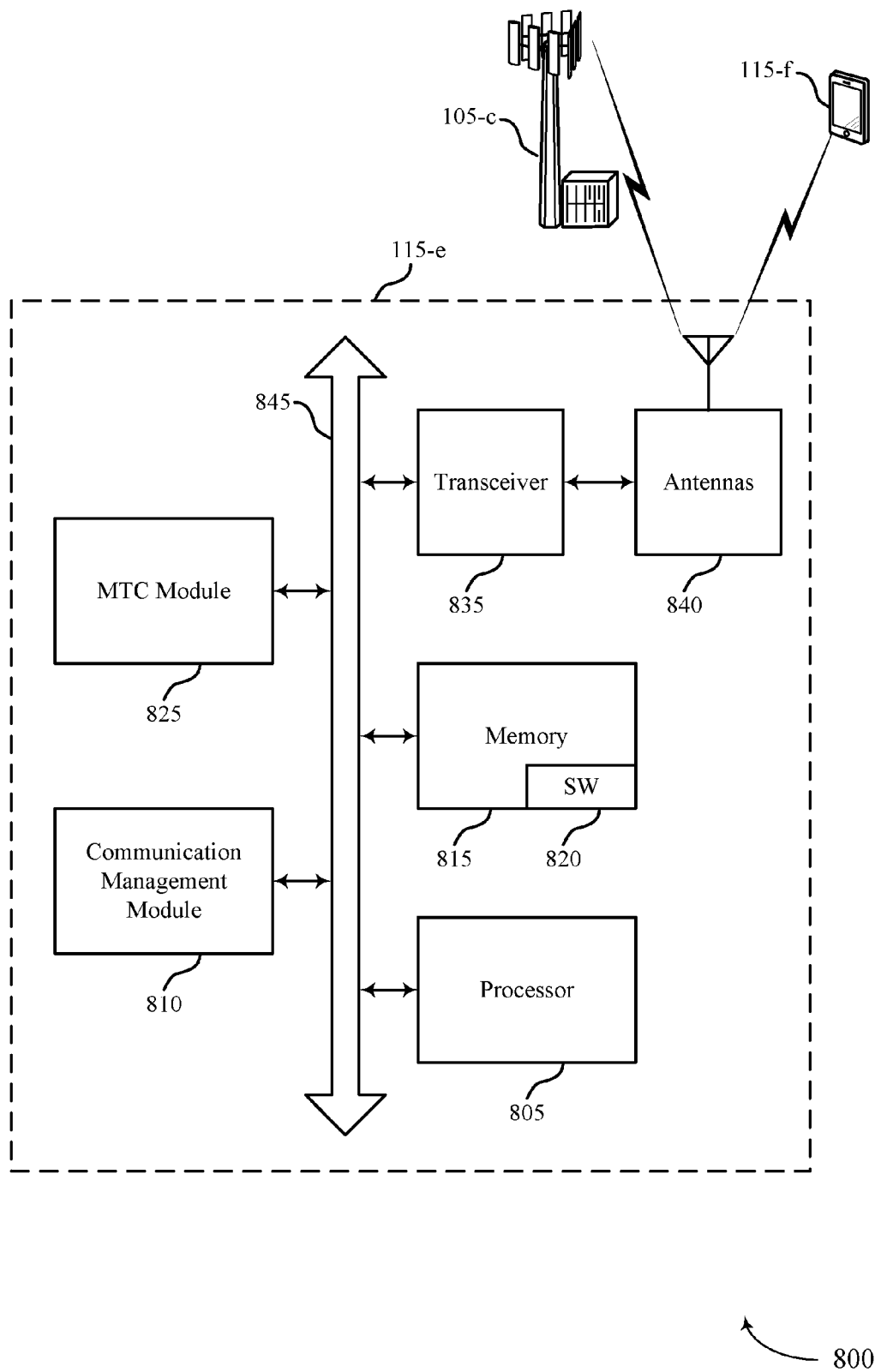
FIG. 8 illustrates a block diagram of a system including a UE configured to use open-loop timing and cyclic prefixes in cellular IoT communication in accordance with various aspects of the present disclosure.

FIG. 8 shows a diagram of a system 800 including a UE 115-e configured to use open-loop timing and cyclic prefixes in cellular IoT communication in accordance with various aspects of the present disclosure. System 800 may include UE 115-e, which may be an example of a UE 115 described above with reference to FIGS. 1-7. UE 115-e may include a communication management module 810, which may be an example of a communication management module 510 described with reference to FIGS. 5-7. UE 115-e may also include an MTC module 825. The MTC module 825 may exchange data with a network based on MTC procedures, as described in greater detail below. UE 115-e may also include components for bi-directional voice and data communications including components for transmitting communications and components for receiving communications. For example, UE 115-*e* may communicate bi-directionally with UE 115-*f* and/or base station 105-*c*.

The MTC module 825 may exchange data with a network based on MTC procedures as described above with reference to FIGS. 2-4. Additionally, the MTC module 825 may assist UE 115-*e* to utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

In other examples of MTC procedures, UE 115-*e* may synchronize with a cell using a waveform known to the UE beforehand, and common to a group of cells in the local region. The UE may then determine a physical broadcast channel (PBCH) time. UE 115-*e* may receive the PBCH and use it to determine a physical layer ID for the cell and a frequency for uplink transmissions. The PBCH may also indicate a channel configuration, which may enable UE 115-*e* to perform a random access procedure. The channel configuration may include a time and frequency resource configuration of a shared traffic channel. In some cases, UE 115-*e* may determine resources for data transmission based on an index of a control channel transmission. In some cases, there may be a predetermined delay between control channel transmissions and data channel transmissions. UE 115-*e* may then enter a low power state during the delay.

In other examples of MTC procedures, the MTC module 825 may be configured to identify time and/or frequency resources allocated to UE 115-*e* by base station 105-*c*. In this example, the resource allocation may be apportioned based on a type and class of PRACH signal scheduled for transmission. For instance, the MTC module 825 may determine that UE 115-*e* is assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at UE 115-*e*).

In other examples of MTC procedures, UE 115-*e* may perform an initial access procedure to establish a connection with a serving cell. UE 115-*e* may then arrange a regular transmission schedule with the serving cell including a discontinuous transmission (DTX) cycle and an acknowledgement schedule. UE 115-*e* may enter a low power mode and refrain from any transmission during the a sleep interval of the DTX cycle. UE 115-*e* may then wake up and transmit a message to the serving cell after the sleep interval without performing an another access procedure. UE 115-*e* may perform another access procedure to transmit at times not covered by the regular transmission schedule. For example, if an acknowledgement (ACK) for the message isn't received, UE 115-*e* may perform another access procedure for retransmission.

In other examples of MTC procedures, the MTC module 825 may facilitate using stored control information from a first communication session with the base station to determine the power and timing control information for a subsequent second communication session. Specifically, in this example, the MTC module 825 may establish a first communication session with the base station 105-*c* and receive, during the first communication session, closed loop control information from the base station 105-*c* to aid the UE 115-*e* in adjusting transmit signal symbol timing and/or power control levels associated with an uplink transmission. In such instance, the MTC module 825 may facilitate storing, in the memory 815, the transmit power and symbol timing information derived from the closed loop control information during the first communication session. Subsequently, the MTC module 825 may utilize the stored closed loop control information from the first communication session to determine the transmit signal power and/or symbol timing to establish a second communication session with the base station 105-*c*.

The UE 115-*e* may also include a processor module 805, and memory 815 (including software (SW)) 820, a transceiver module 835, and one or more antenna(s) 840, each of which may communicate, directly or indirectly, with each other (e.g., via buses 845). The transceiver module 835 may communicate bi-directionally, via the antenna(s) 840 and/or wired or wireless links, with one or more networks, as described above. For example, the transceiver module 835 may communicate bi-directionally with a base station 105 and/or another UE 115. The transceiver module 835 may include a modem to modulate the packets and provide the modulated packets to the antenna(s) 840 for transmission, and to demodulate packets received from the antenna(s) 840. While UE 115-*e* may include a single antenna 840, UE 115-*e* may also have multiple antennas 840 capable of concurrently transmitting and/or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., open-loop timing and use of cyclic prefixes in cellular IoT communication, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU) such as an ARM® based processor or those made by Intel Corporation® or AMD®, a microcontroller, an ASIC, etc).

Figure 9:
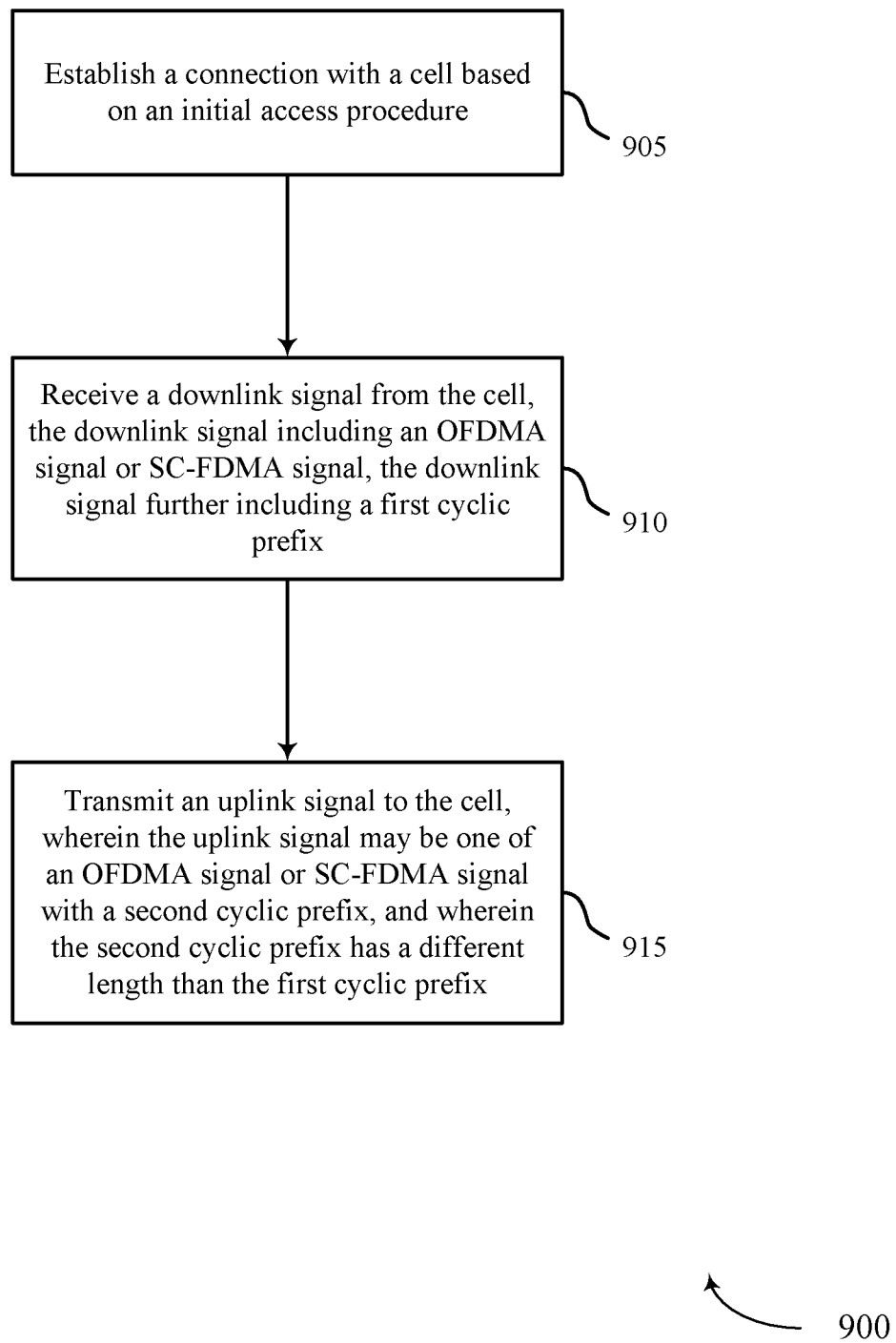
FIG. 9 shows a flowchart illustrating a method for using open-loop timing and cyclic prefixes in cellular IoT communication in accordance with various aspects of the present disclosure.

FIG. 9 shows a flowchart illustrating a method 900 for using open-loop timing and cyclic prefixes in cellular IoT communication in accordance with various aspects of the present disclosure. The operations of method 900 may be implemented by a UE 115 or its components as described with reference to FIGS. 1-8. For example, the operations of method 900 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware.

At block 905, the UE 115 may establish a connection with a cell based on an initial access procedure as described above with reference to FIGS. 2-4. In certain examples, the operations of block 905 may be performed by the initial access module 605 as described above with reference to FIG. 6.

At block 910, the UE 115 may receive a downlink signal from the cell, the downlink signal comprising an OFDMA signal or SC-FDMA signal, the downlink signal further comprising a first cyclic prefix as described above with reference to FIGS. 2-4. In certain examples, the operations of block 910 may be performed by the downlink cyclic prefix module 610 as described above with reference to FIG. 6.

At block 915, the UE 115 may transmit an uplink signal to the cell, wherein the uplink signal is one of an OFDMA signal or SC-FDMA signal with a second cyclic prefix, and wherein the second cyclic prefix has a different length than the first cyclic prefix as described above with reference to FIGS. 2-4. In certain examples, the operations of block 915 may be performed by the uplink cyclic prefix module 615 as described above with reference to FIG. 6.

Figure 10:
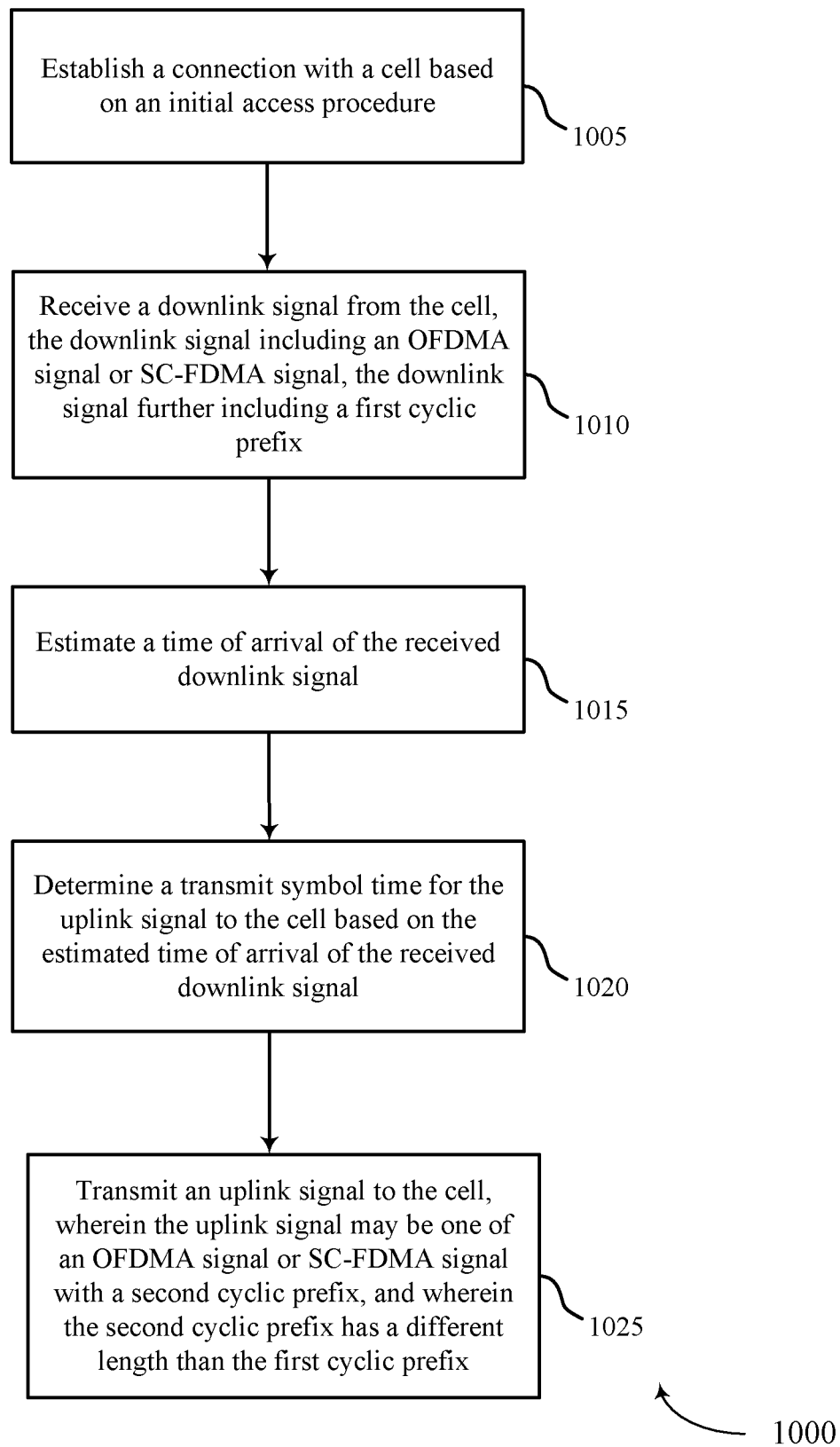
FIG. 10 shows a flowchart illustrating a method for using open-loop timing and cyclic prefixes in cellular IoT communication in accordance with various aspects of the present disclosure.

FIG. 10 shows a flowchart illustrating a method 1000 for using open-loop timing and cyclic prefixes in cellular IoT communication in accordance with various aspects of the present disclosure. The operations of method 1000 may be implemented by a UE 115 or its components as described with reference to FIGS. 1-8. For example, the operations of method 1000 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects of the functions described below using special-purpose hardware. The method 1000 may also incorporate aspects of method 900 of FIG. 9.

At block 1005, the UE 115 may establish a connection with a cell based on an initial access procedure as described above with reference to FIGS. 2-4. In certain examples, the operations of block 1005 may be performed by the initial access module 605 as described above with reference to FIG. 6.

At block 1010, the UE 115 may receive a downlink signal from the cell, the downlink signal comprising an OFDMA signal or SC-FDMA signal, the downlink signal further comprising a first cyclic prefix as described above with reference to FIGS. 2-4. In certain examples, the operations of block 1010 may be performed by the downlink cyclic prefix module 610 as described above with reference to FIG. 6.

At block 1015, the UE 115 may estimate a time of arrival of the received downlink signal as described above with reference to FIGS. 2-4. In certain examples, the operations of block 1015 may be performed by the open-loop timing control module 705 as described above with reference to FIG. 7.

At block 1020, the UE 115 may determine a transmit symbol time for the uplink signal to the cell based on the estimated time of arrival of the received downlink signal as described above with reference to FIGS. 2-4. In certain examples, the operations of block 1020 may be performed by the open-loop timing control module 705 as described above with reference to FIG. 7.

At block 1025, the UE 115 may transmit an uplink signal to the cell, wherein the uplink signal is one of an OFDMA signal or SC-FDMA signal with a second cyclic prefix, and wherein the second cyclic prefix has a different length than the first cyclic prefix as described above with reference to FIGS. 2-4. In certain examples, the operations of block 1025 may be performed by the uplink cyclic prefix module 615 as described above with reference to FIG. 6.

Figure 11:
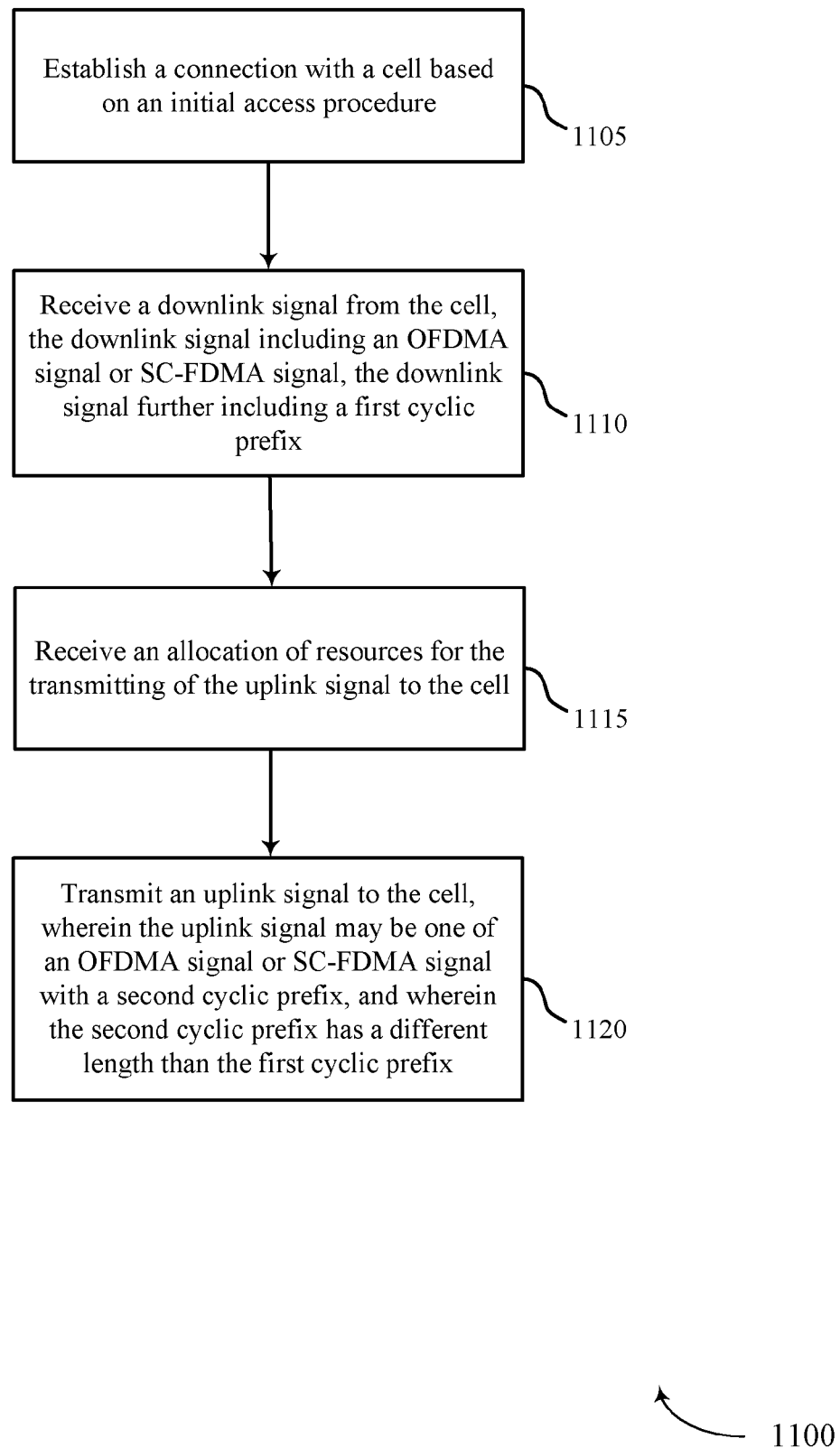
FIG. 11 shows a flowchart illustrating a method for using open-loop timing and cyclic prefixes in cellular IoT communication in accordance with various aspects of the present disclosure.

FIG. 11 shows a flowchart illustrating a method 1100 for using open-loop timing and cyclic prefixes in cellular IoT communication in accordance with various aspects of the present disclosure. The operations of method 1100 may be implemented by a UE 115 or its components as described with reference to FIGS. 1-8. For example, the operations of method 1100 may be performed by the communication management module 510 as described with reference to FIGS. 5-9. In some examples, a UE 115 may execute a set of codes to control the functional elements of the UE 115 to perform the functions described below. Additionally or alternatively, the UE 115 may perform aspects of the functions described below using special-purpose hardware. The method 1100 may also incorporate aspects of methods 900 and 1000 of FIGS. 9 and 10.

At block 1105, the UE 115 may establish a connection with a cell based on an initial access procedure as described above with reference to FIGS. 2-4. In certain examples, the operations of block 1105 may be performed by the initial access module 605 as described above with reference to FIG. 6.

At block 1110, the UE 115 may receive a downlink signal from the cell, the downlink signal comprising an OFDMA signal or SC-FDMA signal, the downlink signal further comprising a first cyclic prefix as described above with reference to FIGS. 2-4. In certain examples, the operations of block 1110 may be performed by the downlink cyclic prefix module 610 as described above with reference to FIG. 6.

At block 1115, the UE 115 may receive an allocation of resources for the transmitting of the uplink signal to the cell as described above with reference to FIGS. 2-4. In certain examples, the operations of block 1115 may be performed by the initial access module 605 as described above with reference to FIG. 6.

At block 1120, the UE 115 may transmit an uplink signal to the cell, wherein the uplink signal is one of an OFDMA signal or SC-FDMA signal with a second cyclic prefix, and wherein the second cyclic prefix has a different length than the first cyclic prefix as described above with reference to FIGS. 2-4. In certain examples, the operations of block 1120 may be performed by the uplink cyclic prefix module 615 as described above with reference to FIG. 6.

The transmitting of the uplink signal at block 1120 may further include transmitting a first transmission of data on an uplink symbol that includes an extended cyclic prefix that comprises at least half of the resources allocated for the transmitting of the uplink signal as described above with reference to FIGS. 2-4.

Thus, methods 900, 1000, and 1100 may provide for use of open-loop timing and cyclic prefixes in cellular IoT communication. It should be noted that methods 900, 1000, and 1100 describe possible embodiments, and that the operations and the steps may be rearranged or otherwise modified such that other embodiments are possible. In some examples, aspects from two or more of the methods 900, 1000, and 1100 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   establishing a connection with a cell based on an initial access procedure;
   receiving a downlink signal from a cell, the downlink signal comprising a first cyclic prefix;
   estimating a time of arrival of the received downlink signal;

determining a transmit symbol time for an uplink signal based on the estimated time of arrival of the received downlink signal; and transmitting the uplink signal to the cell, the uplink signal comprising a second cyclic prefix having a different length than the first cyclic prefix.

2. The method of claim 1, wherein a subcarrier spacing of the downlink signal is different from a subcarrier spacing of the uplink signal.

3. The method of claim 1, wherein the uplink signal includes payload data traffic.

4. The method of claim 1, wherein a length of the second cyclic prefix is longer than a length of the first cyclic prefix.

5. The method of claim 1, wherein a subcarrier spacing of the downlink signal is larger than a subcarrier spacing of the uplink signal.

6. The method of claim 1, further comprising:

receiving an allocation of resources for the transmitting of the uplink signal to the cell; and wherein the transmitting of the uplink signal comprises:

transmitting a first transmission of data on an uplink symbol that includes an extended cyclic prefix that comprises at least half of the resources allocated for the transmitting of the uplink signal.

7. The method of claim 1, further comprising synchronizing the uplink signal to account for a round trip delay for communications between the UE and the cell.

8. The method of claim 1, wherein the downlink signal comprises an orthogonal frequency division multiple access (OFDMA) signal.

9. The method of claim 1, wherein the uplink signal comprises a single carrier frequency division multiple access (SC-FDMA) signal.

10. An apparatus for wireless communication at a user equipment (UE), comprising:

a processor;

memory in electronic communication with the processor; and instructions stored in the memory; wherein the instructions are executable by the processor to:

establish a connection with a cell based on an initial access procedure, receive a downlink signal from the cell, the downlink signal comprising a first cyclic prefix, estimate a time of arrival of the received downlink signal, determine a transmit symbol time for an uplink signal to the cell based on the estimated time of arrival of the received downlink signal, and transmit the uplink signal to the cell, the uplink signal comprising a second cyclic prefix having a different length than the first cyclic prefix.

11. The apparatus of claim 10, wherein a subcarrier spacing of the downlink signal is different from a subcarrier spacing of the uplink signal.

12. The apparatus of claim 10, wherein a length of the second cyclic prefix is longer than a length of the first cyclic prefix.

13. The apparatus of claim 10, wherein the instructions are further executable by the processor to:

receive an allocation of resources for the transmitting of the uplink signal to the cell; and wherein the instructions to transmit the uplink signal comprise instructions to:

transmit a first transmission of data on an uplink symbol that includes an extended cyclic prefix that comprises at least half of the resources allocated for the transmitting of the uplink signal.

14. The apparatus of claim 10, wherein the downlink signal comprises an orthogonal frequency division multiple access (OFDMA) signal.

15. The apparatus of claim 10, wherein the uplink signal comprises a single carrier frequency division multiple access (SC-FDMA) signal.

16. A non-transitory computer-readable medium storing code for wireless communication at a user equipment (UE), the code comprising instructions executable to:

establish a connection with a cell based on an initial access procedure; receive a downlink signal from the cell, the downlink signal comprising a first cyclic prefix;

estimate a time of arrival of the received downlink signal determine a transmit symbol time for an uplink signal to the cell based on the estimated time of arrival of the received downlink signal; and transmit the uplink signal to the cell, the uplink signal comprising a second cyclic prefix having a different length than the first cyclic prefix.

17. The non-transitory computer-readable medium of claim 16, wherein a subcarrier spacing of the downlink signal is different from a subcarrier spacing of the uplink signal.

18. The non-transitory computer-readable medium of claim 16, wherein a length of the second cyclic prefix is longer than a length of the first cyclic prefix.

19. The non-transitory computer-readable medium of claim 16, wherein the instructions are further executable to:

receive an allocation of resources for the transmitting of the uplink signal to the cell; and wherein the instructions to transmit the uplink signal comprise instructions to:

transmit a first transmission of data on an uplink symbol that includes an extended cyclic prefix that comprises at least half of the resources allocated for the transmitting of the uplink signal.

* * * * *